Jan. 5, 1954     F. WALLER     2,664,784
APPARATUS FOR MEASURING OBJECTS BY PHOTOGRAPHY
Original Filed Feb. 4, 1948     3 Sheets—Sheet 1

Fred Waller
INVENTOR

BY
ATTORNEY

Jan. 5, 1954  F. WALLER  2,664,784
APPARATUS FOR MEASURING OBJECTS BY PHOTOGRAPHY
Original Filed Feb. 4, 1948  3 Sheets-Sheet 2
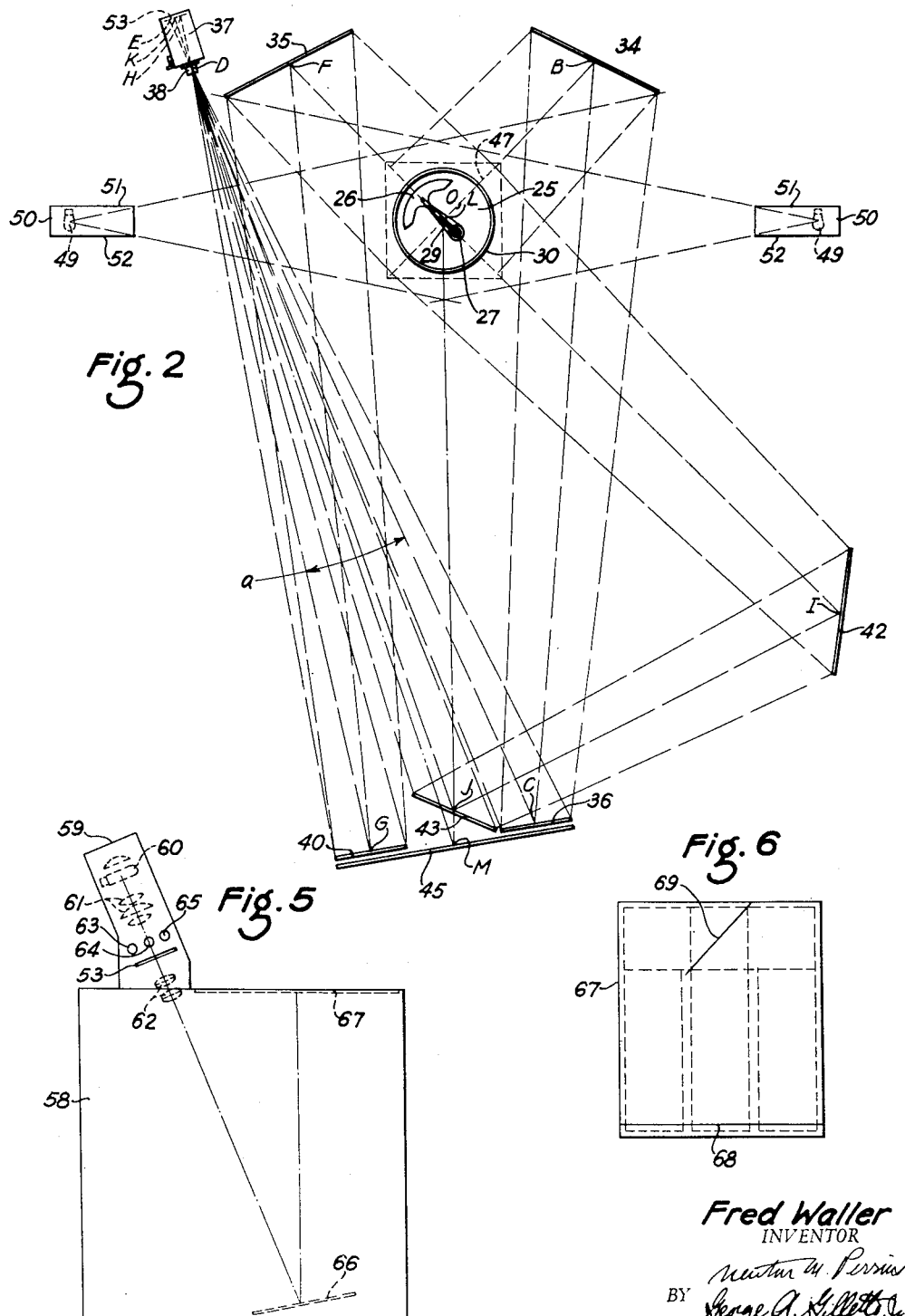
Fred Waller
INVENTOR
BY
ATTORNEYS Jan. 5, 1954 F. WALLER 2,664,784
APPARATUS FOR MEASURING OBJECTS BY PHOTOGRAPHY
Original Filed Feb. 4, 1948 3 Sheets-Sheet 3

Fred Waller
INVENTOR

BY *Newton M. Perrine*
*George A. Gillett, Jr.*
ATTORNEY

Patented Jan. 5, 1954

2,664,784

UNITED STATES PATENT OFFICE 2,664,784

APPARATUS FOR MEASURING OBJECTS BY PHOTOGRAPHY

Fred Waller, Huntington Station, N. Y., assignor, by mesne assignments, to The Henry Booth Methods Corporation, New York, N. Y., a corporation of Delaware Original application February 4, 1948, Serial No. 6,217. Divided and this application September 30, 1949, Serial No. 118,927

10 Claims. (Cl. 88—74)

1

The present invention relates to photography and more particularly to studio apparatus in which a plurality of images of different aspects of an object or subject and the images of members for measuring said object are simultaneously directed to a camera and is a division of my copending application Serial No. 6,217, filed February 4, 1948.

While it is known that photography may be used for making measurements of an object or of a person, known methods and apparatus are not sufficiently complete or accurate enough to permit the procurement of all the required measurements or information. Furthermore, it has not before been commercially practical to obtain by means of a single photograph all the contours and dimensions necessary to make the patterns for a suit of clothes so that the perfect fit can be obtained without one or more try-ons.

The primary object of the present invention is the provision of an apparatus by which a single photograph of an object or person can be taken and from which can be made all the measurements necessary to determine the contour and size of the object or of a person.

Another object of the invention is the provision of a studio including an object support, a system of mirrors, objects of predetermined arrangement and dimension, and a camera for obtaining a photograph of three or more aspects of the object or the person to be measured.

A still further object of the invention is the arrangement of a mirror system for reflecting and directing three aspects of the object to a camera point or camera along optical paths, such that the three images of the object in the camera are all to the same scale.

Another object of the invention is the provision of objects of known size and dimension arranged to be photographed simultaneously with the object or person to be measured and located so as not to interfere with the positioning of the object.

A further object of the invention is the provision in one of such objects of known dimension of an opening so that a photograph can be made therethrough of the person or object simultaneously with a photograph of the object of known size.

Still another object of the invention is the procurement of a photograph having three laterally spaced images of lateral aspects of the object and having a fourth area above the laterally spaced areas for an image of the top of the object, all of said images having been made simultaneously in the studio of the invention.

2

Other and further objects of the invention will be suggested to those skilled in the art from the description which follows.

In the illustrated embodiments of the invention like reference characters designate similar elements shown in the drawings which consist of the several views as follows:

Fig. 2 is a plan view of the studio shown in Fig. 1 with construction lines representing the image paths from the object support to the camera and as reflected by the several mirrors;

Fig. 5 is a diagrammatic side elevation of a viewer for determining displacements of the images from their plane of interest or focal plane; and Fig. 6 is a plan view of the screen of the projector shown in Fig. 5.

Figures 1, 4:
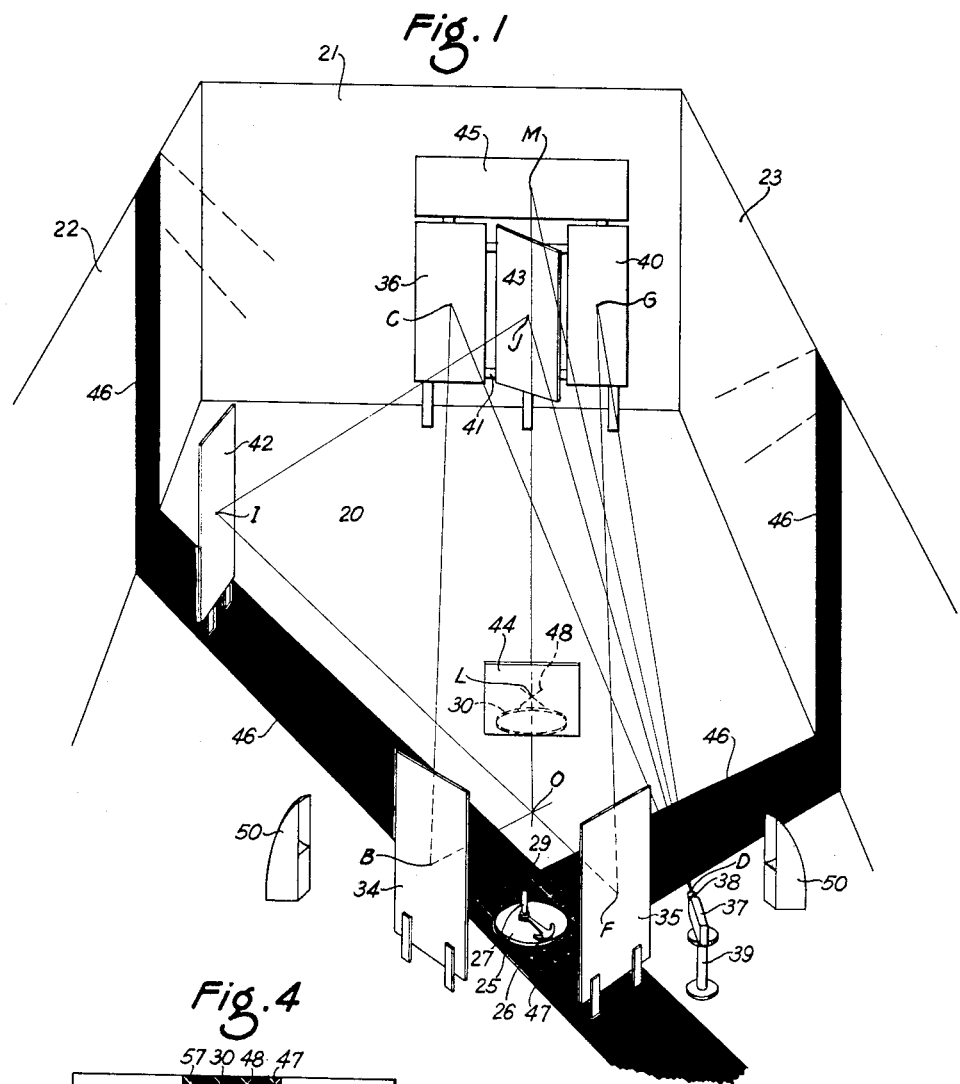
Fig. 1 is a perspective view of a studio, according to the invention, including an object support, a system of mirrors, illuminating means and a camera.
Fig. 4 is a plan view of a photograph made with the apparatus of the invention.

The photograph of the object or person to be measured can be made in any suitable room but in commercial establishments and stores space is often limited, and it is preferable to keep the space requirements to a minimum. For example, the room may be as shown having a floor 20, an end wall 21, side walls 22 and 23 and a ceiling 24.

The object or person is located in a predetermined position on an object support. According to the invention, the object support also constitutes one of the object of known shape and size. Specifically, a flat circular disk 25 is placed on the floor 20 of the studio and carries a foot guide 26 for the feet of the person to be photographed. An in-seam measuring device comprises a vertical column 27 carrying a scale 28 and having an inverted L-shaped member 29 slidable in the vertical column 27 for engaging the crotch of the person to be measured in the manner well illustrated in Fig. 4.

Figure 3:
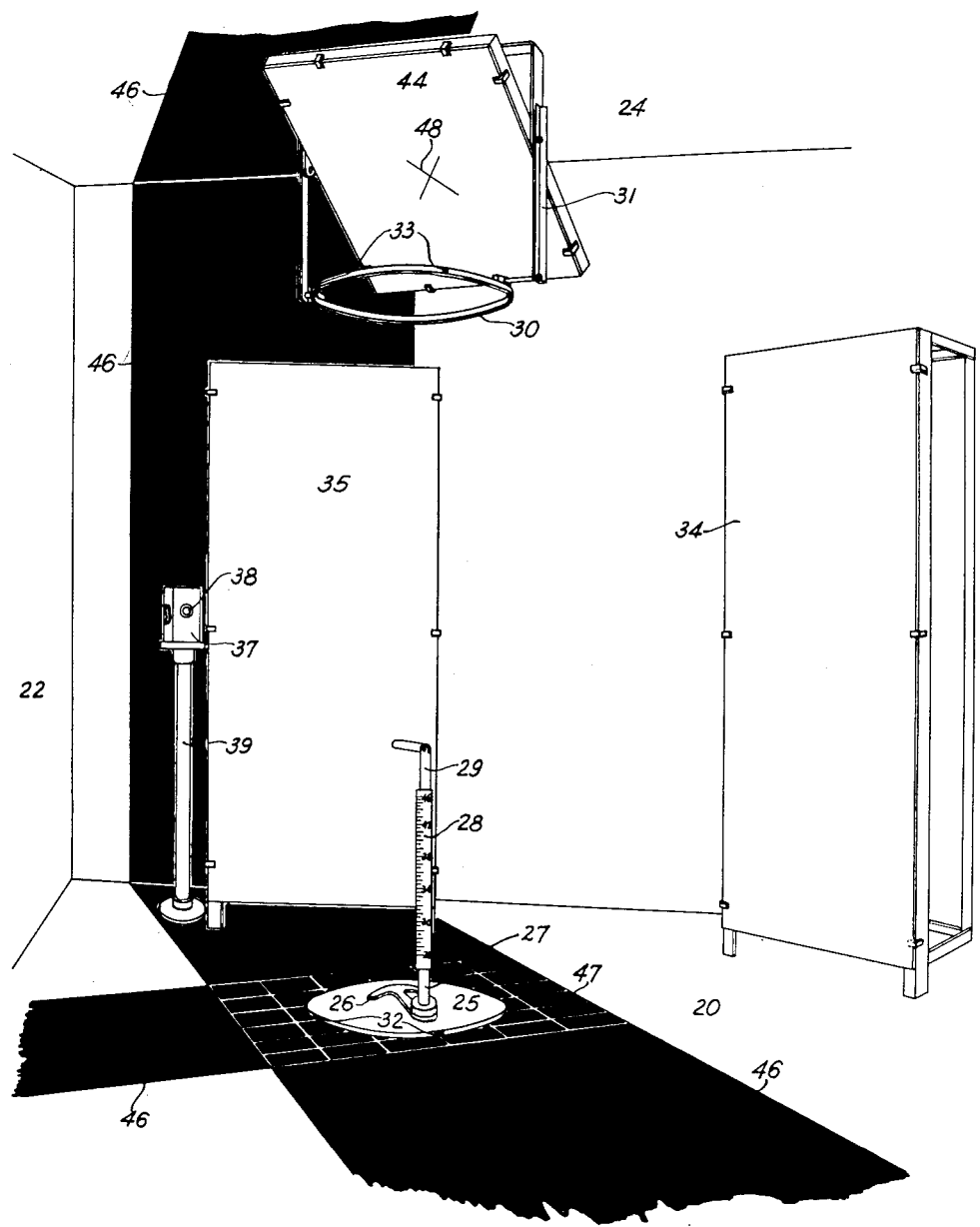
Fig. 3 is a fragmentary perspective view of one end of the studio, according to the invention, to enlarged scale and particularly showing the overhead object of known dimension and mirror.

The other object of known dimension, as shown in Fig. 3, is a flat circular ring 30 which is mounted from the ceiling 24 by a bracket 31. Disk 25 and ring 30 constitute a pair of symmetrically flat members of equal size and shape and are mounted on the floor and by the bracket 31, respectively, in parallel spaced relation, in axial alignment and congruent to each other so that the peripheries of said disk 25 and ring 30 define an imaginary right cylinder within which the object to be photographed is located by the foot guide 26. It will also be noted that the upper object of known dimension is provided with an opening, as in the circular ring 30, through which a photograph of the top view of the object or person may be taken simultaneously with a photograph of the object of known dimension or ring 30, see the top view in the photograph of Fig. 4.

The periphery of disk 25 is provided with a plurality of index marks 32 and the periphery of ring 30 is provided with a plurality of index marks 33. In each case said index marks 32 and 33 are in quadrature on the peripheries of their supports and are in the same angular position on each circular member so that opposite pairs of the index marks define mutually perpendicular vertical planes with their line of intersection at the center of the right cylinder defined by disk 25 and ring 30. Additional advantages of the particular form of the objects of known dimension and arrangement of the index marks thereon will appear subsequently.

The mirror system, according to the present invention, is constructed and arranged to reflect and direct simultaneously images of three aspects of the object at precisely the same scale and, preferably, also to reflect and direct a fourth or top view of the object or person to the camera point. For making measurements for wearing apparel it is desirable to have front, back, and profile views of the person, all at the same scale. This is accomplished, according to the invention, by providing a series of mirrors to direct an image of one lateral aspect of the person along a central path and onto the central portion of the camera frame and arranging two other series of mirrors to direct images of two different lateral aspects of the person along converging paths and onto separated portions of the camera frame on each side of the central image. In order that all three images of the different lateral aspects be at the same scale, it is necessary that the length of the central path be equal to the length of each converging path times the cosine of ½ the angle therebetween. Also, it should be pointed out that it is only possible to equalize the scale for each image of a lateral aspect by the use of mirrors to reflect images thereof and to adjust the length of the paths as above defined.

Specifically, mirrors 34 and 35 are mounted on the studio floor 20 adjacent the flat circular disk 25. A vertical relay mirror 36 directs the image from mirror 34 to the camera 37 which has a lens 38 and which is mounted upon a stand 39 or other suitable support. A vertical relay mirror 40 directs the reflected image from mirror 35 to the camera 37. The relay mirrors 36 and 40 are supported by a suitable frame 41. As best seen from Fig. 2, said mirrors 34 and 36 and mirrors 35 and 40 direct the images of the person or object along paths of equal length and which converge at the camera point or within the camera lens 38.

A mirror 42 is mounted at some distance from the object support and reflects an image of the opposite side of the object from that reflected from mirror 35 or of the front view according to the illustrated embodiment. A vertical relay mirror 43 is mounted on the frame 41 and reflects the image from mirror 42 into the camera lens 38. The object support, mirrors 34, 35, 36, 40, 42 and 43 and camera 37 are located so that the path from the center of the object and reflected by mirrors 42 and 43 is a central path and has a length equal to the length of either or both of the converging paths from the object and reflected by mirrors 34 and 36, and 35 and 40, respectively, to the camera lens 38 times the cosine of ½ of the angle between the central lines of the converging paths, such angle being indicated as $a$ in Fig. 2.

The overhead mirror 44 is mounted by bracket 31 over the ring 30 and reflects a top view of the object or person to an inclined relay mirror 45 mounted on the frame 41. The image of the top view of the object passes through the ring 30 and is reflected by mirrors 44 and 45 to the camera lens 38. However, the scale of the top view of a person or object will be determined by its height and hence measurements of length from such top view are not wholly reliable. Nevertheless, angular measurements, such as the amount that the object or person is twisted, can be made from such top view.

Preferably, the floor, walls and ceiling of the studio are darkened or rendered light-absorbing within the field of view of any of the mirrors. This may be accomplished by dark stripes 46, best shown in Figs. 1 and 3. Also, such dark stripes provide a dark background in the positive photograph for the generally lighter person being photographed. In addition, the dark stripes also form a background for reference lines 47 which are parallel to the planes defined by opposite pairs of index marks 32 and 33. The advantage of such reference lines, in connection with determination of the correction necessary on account of an abnormal twist of the person being photographed, is described in my copending application Serial No. 118,923, filed September 30, 1949. A reference mark or cross 48 is placed on the overhead mirror 44 directly over the center of the cylinder defined by ring 30 and disk 25. Such reference mark will show on the top view, see Fig. 4, and indicates the amount that the person being photographed is tilted or is leaning to one side or the other.

An illuminating means is provided for artificial lighting of the object or person to be photographed. Preferably, such illuminating means is of the flash type so as to supply the required illumination with the least amount of discomfort to the person being photographed. According to the invention, such illumination means comprises a flash lamp 49 mounted within a reflector 50 which has parallel side walls 51 and 52 arranged and spaced to limit the beam from the flash lamp 49 so that direct rays do not strike any of the mirrors or the camera lens 38. As best shown in Fig. 2, the side walls of the reflector 50 limit the lateral spread of the beams from the flash lamps 49 so that direct rays do not reach either of the mirrors 34 or 35. Also, the reflectors 50 limit the vertical extent of the light beam so that no direct rays strike the overhead mirror 44. It should also be noted that the arrangement of the mirrors is such that the camera 37 may be located behind one of the mirrors to conceal more or less the camera from the person to be photographed and so that the mirror serves to shield the camera from any direct rays from the flash lighting means. This advantageous location of the camera is best shown in Fig. 2 and is deemed to be commercially important because the less conspicuous position of the camera has a beneficial psychological effect on the person to be photographed and because the additional shielding of the camera from direct light rays improves the quality of the photographs made.

The mirror and lighting systems described produce a photograph 53, such as shown in Fig. 4, and comprise profile, front, back and top views of the object or person on the object support. Such photograph has three laterally spaced image areas 54, 55 and 56 and a fourth area 57 above said laterally spaced image areas for a top view of the object or person. Such photograph 53, in addition to the respective images of the object or person, also contains images of the circular disk 25, of the ring 30, the index marks 32 and 33 thereon, of the in-seam measuring device and scale 23, a top view of the ring 30 with the reference cross 48 as the center thereof. Also, the top view shows the disk 25 within the circular ring 30. Such photograph provides a check upon the proper location of the objects of known dimensions, disk 25 and ring 30, and of any of the mirrors. For instance, if any one of the mirrors is inadvertently shifted, the size or alignment of the images of disk 25 and ring 30 will be altered to indicate immediately that correction is required in that particular studio. The photograph 53 may also include, in a known manner, a harness of measuring tapes on the person being photographed.

As shown in Figs. 1, 2 and 4, the central ray for the profile view is OBCD and it strikes a point E on the profile image area 54 of photograph 53. Likewise, the central ray for the rear view is OFGD and it strikes a point H on the rear view image area 56 of photograph 53. Said central rays for the profile and rear views therefore converge at an angle CDG. The central ray for the middle lateral view is OIJD and it strikes a point K on the image area 55 of photograph 53. Finally, the central ray for the top view is OLMD and it strikes the intersection of the reference cross 48 on the top image area 57 of photograph 53.

As already stated equalization of the scales for the images of lateral aspects of the objects requires that the length of the central ray for the center image shall be equal to the length of the central rays for the outer images times the cosine of ½ the angle between the converging central rays. But such statement of the relationship assumes that both central rays for the outer images are of the same length and that the central ray for the center image bisects the angle between said central rays for the outer images.

The present invention, however, contemplates equalization of image scales under other conditions, such as unequal lengths of the central rays for the outer images and/or unequal angles between the central ray for the center image and the central rays for the outer images. Also, since the forward conjugate of lens 38 coincides with the central ray for the center image, the relationship for equalizing the image scales is better stated as a function of such central ray OIJD as follows:

$$OBCD = \frac{OIJD}{\cos \angle CDJ} = \frac{KD}{\cos \angle KDE} \times \text{magnification}$$

$$OFGD = \frac{OIJD}{\cos \angle GDJ} = \frac{HD}{\cos \angle HDK} \times \text{magnification}$$

Alternatively such relationships may be stated as a function of the angle between adjacent central rays, as follows:

$$\tan^{-1} \frac{\text{image center distance}}{\text{rear conjugate lens 38}} = \tan^{-1} \frac{KH \text{ or } KE}{DK}$$

The photograph 53 may now be placed in a viewer or projector 58 having a lamphouse 59 containing a conventional light source 60, condenser lenses 61, objective lenses 62 and vertical, lateral and rotatable adjustments for the photograph 53 obtained in a known manner respectively by the knobs 63, 64 and 65. The image beam in projector 58 is reflected by a mirror 66 onto a screen 67. Preferably, the screen 67 is etched or otherwise provided with a horizontal reference line 68 and a diagonal reference line 69.

By means of such a projector it is possible to observe the displacement of any of the images of lateral aspects of the object with respect to each other, the amount that the object is twisted, tilted or leans to one side or the other. Any such displacement of the person from the mutually perpendicular planes defined by the index marks 32 and 33 or from the line of their intersection indicated by reference cross 48 results in changing the scale of the image because the scales of the images are exactly equal only along lines measured in the focal or reference planes defined by the reference marks. Since it is not possible to always position a person to be photographed with such reference planes precisely intersecting the profile and broadside views of the person and since for tailoring purposes it is preferable to have the person assume a natural position, it sometimes is necessary to correct the images on the photograph 53 before taking the measurements to be used in making the wearing apparel. For this purpose, the projector 58 can be used to determine from the image area 57 the amount that the person is tilted with respect to the vertical plane defined by the reference marks 32 and 33 in image area 54 or from the intersection of the reference planes defined by the reference cross 48 in image area 57. Similarly, by observation of image areas 55 and/or 57 the amount that the person is leaning to one side or the other can be ascertained by comparison of the person's image with the reference marks 32 and 33 in image area 55 and with reference cross 48 in image area 57.

If desired, the amount of such leaning to one side or the other can be verified by comparison of the person's image with the reference marks 32 and 33 in image area 56. Finally, observation of the top view of the person in image area 57 permits determination of the amount that the person is twisted and for this purpose comparison is made with the diagonal reference line 69 and with the images of the diagonal lines 47 on the floor of the studio. While it is preferable to make the checks on mirror positions and on positions of disk 25 and ring 30 in the projector 58, it will be apparent that such check and the determinations of displacements of the person can be made directly on the photographic negative or in the optical printer described in my copending application noted above.

Since many variations of the method and apparatus disclosed herein are possible, the present disclosure is merely illustrative. The scope of the invention including apparatus and methods of operation is defined by the claims which follow.

Having now particularly described my invention, what I desire to secure by Letters Patent of the United States and what I claim is:

1. An apparatus for measuring a plurality of different aspects of a subject by photography from a camera point comprising a pair of members of known dimensions aligned in fixed vertically spaced and parallel relation, said members having indicia marks arranged in quadrature thereon for defining two mutually perpendicular planes intersecting along a vertical line substantially coinciding with the vertical center line of said subject, and within which planes measurements of the subject are to be made, and a plurality of sets of plane mirrors for reflecting and directing a plurality of images of said subject and of said members within said planes to said camera point at precisely the same scale, each set comprising at least a pair of mirrors arranged with respect to said subject and members and to one of said planes for reflecting and directing only the aspect of said subject and members in said one plane to said camera point.

2. An apparatus for measuring a plurality of different aspects of a subject by photography from a camera point comprising a pair of members of known dimensions aligned in fixed vertically spaced and parallel relation, said members having indicia marks arranged in quadrature thereon for defining two mutually perpendicular planes intersecting along a vertical line substantially coinciding with the vertical center line of said subject, and within which planes measurements of the subject are to be made, and a plurality of sets of plane mirrors for reflecting and directing a plurality of images of said subject and of said members within said planes to said camera point at precisely the same scale, each set comprising a like number of mirrors arranged with respect to said subject and members and to one of said planes for reflecting and directing only the aspect of said subject and members in said one plane to said camera point.

3. An apparatus for measuring a plurality of different aspects of a subject by photography from a camera point comprising a pair of members of known dimensions aligned in fixed vertically spaced and parallel relation, said members having indicia marks arranged in quadrature thereon for defining two mutually perpendicular planes intersecting along a vertical line substantially coinciding with the vertical center line of said subject, and within which planes measurements of the subject are to be made, and a plurality of sets of plane mirrors for reflecting and directing a plurality of images of said subject and of said members within said planes to said camera point at precisely the same scale, each set comprising a mirror arranged with respect to said subject, members, and one of said planes and a second mirror arranged between said first-mentioned mirror and said camera point for reflecting and directing only the aspect of said subject and members in said one plane to said camera point.

4. An apparatus for measuring a plurality of different aspects of a subject by photography from a camera point comprising a pair of members of known dimensions aligned in fixed vertically spaced and parallel relation, said members having indicia marks arranged in quadrature thereon for defining two mutually perpendicular planes intersecting along a vertical line substantially coinciding with the vertical center line of said subject, and within which planes measurements of the subject are to be made, a plurality of sets of plane mirrors for reflecting and directing a plurality of images of said subject and of said members within said planes to said camera point at precisely the same scale, each set comprising at least a pair of mirrors one of which is arranged with respect to one of said planes and said subject and members for reflecting and directing only the aspect of said subject and members in said one plane to said camera point, illuminating means for said subject displaced laterally from said members and capable of directly illuminating said mirrors and camera point, and a reflecting means associated with said illuminating means and formed to direct light onto said subject and to prevent direct and reflected light rays from said illuminating means striking any of said mirrors and said camera point.

5. An apparatus for measuring a plurality of different aspects of a subject by photography from a camera point comprising a pair of members of known size and shape and aligned in fixed vertically spaced and parallel relation, said members having indicia marks arranged in quadrature thereon for defining two mutually perpendicular planes intersecting along a vertical line substantially coinciding with the center line of the subject, and within which planes measurements of the subject are to be made, one of said members being a support for said subject, three sets of plane mirrors for reflecting and directing the images of three aspects of said subject and of said members within said planes to said camera point at precisely the same scale, each set comprising at least two mirrors one of which is arranged with respect to one of said planes and said subject and members for directing and reflecting only the aspect of said subject and members in said one plane to said camera point.

6. An apparatus for measuring a plurality of different aspects of a subject by photography from a camera point comprising a pair of symmetrical flat members of equal size and fixed in vertically spaced and parallel relation, said members having indicia marks arranged in quadrature thereon for defining two mutually perpendicular planes intersecting along a vertical line substantially coinciding with the centerline of the subject, and within which planes measurements of the subject are to be made, one of said members being a support for said subject and the other of said members being provided with an opening through which said subject can be photographed, and a plurality of sets of plane mirrors for reflecting and directing a plurality of images of said subject and of said members within said planes to said camera point at precisely the same scale, each set comprising a mirror arranged with respect to said subject and members and one of said planes and a second mirror arranged between said first-mentioned mirror and said camera point for reflecting and directing only the aspect of said subject and said members in said one plane to said camera point.

7. An apparatus for measuring a plurality of different aspects of a subject by photography from a camera point comprising a pair of symmetrical flat members of equal size and shape and fixed in vertically spaced and parallel relation, said members having indicia marks in quadrature thereon for defining two mutually perpendicular planes intersecting along a vertical line substantially coinciding with the center line of the subject, and within which planes measurements of the subject are to be made, one of said members being a support for said subject and the other of said members being provided with an opening through which said subject can be photographed, three sets of vertical plane mirrors, each set comprising at least two mirrors, arranged with respect to said subject and said members to reflect and direct the images of three different aspects of said subject and of said members to said camera point at precisely the same scale within said planes, and a fourth set of plane mirrors, comprising at least two mirrors, arranged above said subject, members and three sets of mirrors to reflect and direct a top view of said subject and members to said camera point at precisely the same scale as the images of said three aspects.

8. An apparatus for measuring a plurality of different aspects of a subject by photography from a camera point comprising a pair of symmetrical flat members of known and equal size and shape and fixed in vertically spaced and parallel relation, said members having indicia marks in quadrature thereon for defining two mutually perpendicular planes intersecting along a vertical line substantially coinciding with the center line of the subject, and within which planes measurements of the subject are to be made, one of said members being a support for said subject, and three sets of plane mirrors, each set comprising at least a pair of mirrors, one set of said mirrors being arranged with respect to said subject and members to reflect and direct an image of one aspect of said subject and members along a central path through said camera point and on to the central portion of a camera frame and said other sets of mirrors being arranged with respect to said subject and members to reflect and direct two other aspects of said subject and members along two spaced paths, each on opposite sides of said central path, converging at said camera point and onto spaced lateral portions of said camera frame at precisely the same scale within said planes as the central image.

9. An apparatus for measuring a plurality of different aspects of a subject by photography from a camera point comprising a pair of symmetrical flat members of equal size and shape and fixed in vertically spaced and parallel relation, said members having indicia marks in quadrature thereon for defining two mutually perpendicular planes intersecting along a vertical line substantially coinciding with the center line of the subject, and within which planes measurements of the subject are to be made, one of said members being a support for said subject and the other of said members being provided with a circular opening through which said subject can be photographed, three mirror systems, each system including a vertical plane mirror and a relay mirror, arranged with respect to said subject and members to reflect and direct three images of different lateral aspects of said subject and members to said camera point at precisely the same scale within said planes, and a fourth mirror system including a mirror arranged above said subject and members and inclined to the vertical to reflect an image of the top of said subject and members and a relay mirror arranged above the relay mirrors of said first-mentioned systems and inclined to the vertical to reflect said image of the top view of said subject and members to said camera point at precisely the same scale as the images of said different lateral aspects of said subject and members.

10. An apparatus for measuring a plurality of different aspects of a subject by photography from a camera point comprising a pair of symmetrical flat members of known and equal size and shape and fixed in vertical and parallel spaced relation, said members having peripheral edges provided with indicia marks in quadrature thereon for defining mutually perpendicular planes intersecting along a vertical line substantially coinciding with the center line of the subject, and within which planes measurements of the subject are to be made, one of said members being a support for said subject and the other of said members being provided with circular opening through which said subject can be photographed, three sets of plane mirrors, each set comprising two plane mirrors, arranged with respect to said subject and said members to reflect and direct the images of three different aspects of said subject and of said members to said camera point and onto laterally spaced portions of a camera frame at precisely the same scale within said planes, a fourth set of mirrors comprising plane mirrors inclined to the vertical and arranged above said subject, members, and three sets of mirrors to reflect and direct a top view of said subject and members to said camera point and onto a portion of the camera frame displaced vertically from the images of said three different aspects and at precisely the same scale as the images of said three different aspects, illuminating means for said subject displaced laterally from said members and capable of directly illuminating said mirrors and camera point, and a reflecting means associated with said illuminating means and formed to direct light onto said subject and to prevent direct and reflected light rays from said illumination means striking any of said mirrors and said camera point.

FRED WALLER.

References Cited in the file of this patent

UNITED STATES PATENTS

| Number | Name | Date |
| --- | --- | --- |
| 656,927 | Biver et al. | Aug. 28, 1900 |
| 862,354 | Stevens | Aug. 6, 1907 |
| 1,391,349 | Tolton | Sept. 20, 1921 |
| 1,520,143 | Sandell | Dec. 23, 1924 |
| 1,886,654 | Dingman | Nov. 8, 1932 |
| 1,937,433 | Moe | Nov. 28, 1933 |
| 1,973,665 | Shannon et al. | Sept. 11, 1934 |
| 2,219,999 | Mears | Oct. 29, 1940 |
| 2,563,451 | Booth | Aug. 7, 1951 |

FOREIGN PATENTS

| Number | Country | Date |
| --- | --- | --- |
| 29,151 | Great Britain | of 1913 |